(No Model.)
C. JOHN.
ICE CREAM FREEZER AND REFRIGERATOR.
No. 248,560. Patented Oct. 18, 1881.
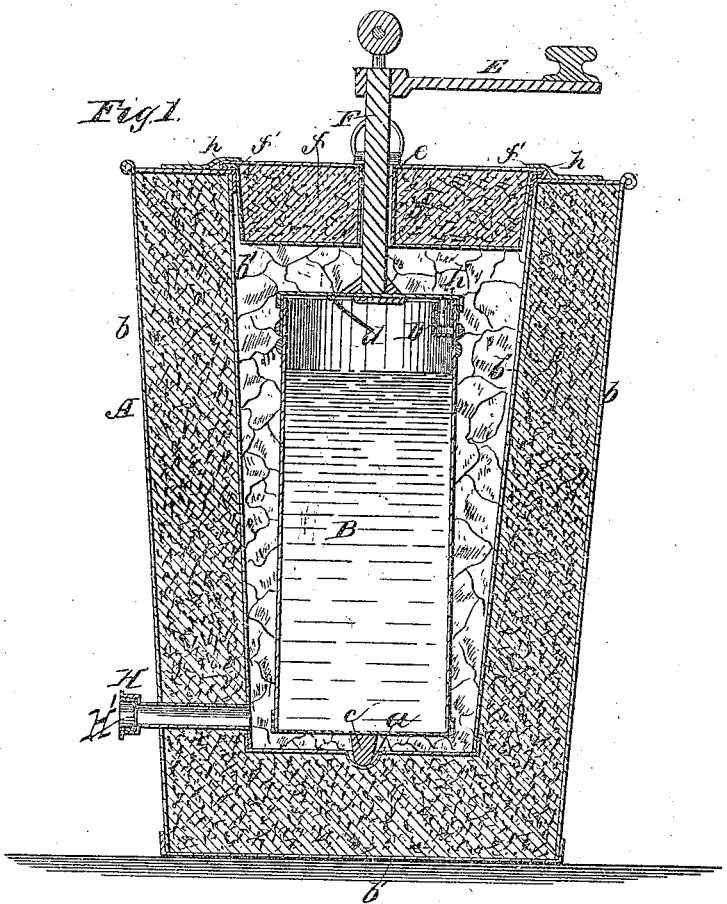
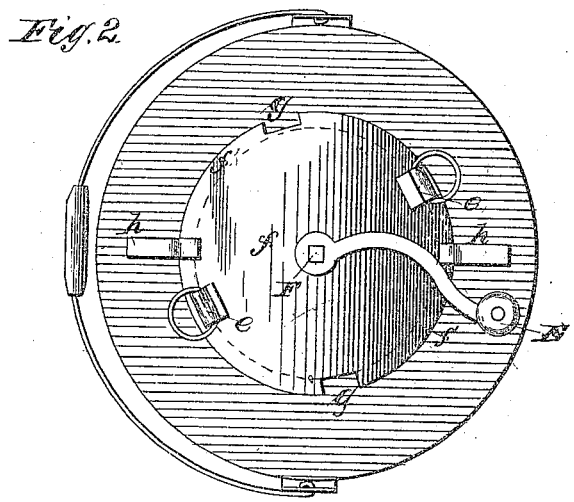
WITNESSES
Fred. G. Dieterich.
Jas. A. Baxter.
INVENTOR
Charles John
By Myers & Co.
Attorneys

UNITED STATES PATENT OFFICE.

CHARLES JOHN, OF RICHMOND, VIRGINIA, ASSIGNOR OF ONE-HALF TO JOHN R. DAY, OF SAME PLACE.

ICE-CREAM FREEZER AND REFRIGERATOR.

SPECIFICATION forming part of Letters Patent No. 248,560, dated October 18, 1881.

Application filed August 17, 1881. (No model.)

*To all whom it may concern:*

Be it known that I, CHARLES JOHN, a citizen of the United States of America, residing at Richmond, in the county of Henrico and State of Virginia, have invented certain new and useful Improvements in Ice-Cream Freezers; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to an improvement in churns and refrigerators; and it consists in providing the device with non-conducting walls and lid; in pivoting the cream-receptacle in a suitable socket in the center of the bottom of the churn, in connection with a pivotal bar and shaft for rotating the same; in the method of fastening the lid of the cream-receptacle in order that the receptacle may be rotated; in the manner of securing the non-conducting cover, and in the combination and arrangement of the parts, as hereinafter more specifically shown and described.

In the drawings, Figure 1 is a sectional view of my device, and Fig. 2 is a plan view thereof.

A represents the walls or outer casing of my device, having provided therein the socket *a*. Between the outer wall, *b*, and the inner wall, *b'*, is placed a suitable non-conducting substance, and the bottom and cover of the device are also rendered non-conducting in a manner similar. The walls may be made of galvanized iron, wood, or other suitable material.

B is a cylindrical cream-receptacle, having rigidly secured thereto the pivotal bar *c*. The cylinder forming the body of the cream-receptacle has formed therein, near the top, the vertical recess D, which is adapted to receive the lug *h'*, the lug being rigidly secured to the lid *d*. In placing the lid upon the receptacle the lug is slipped into the recess, and thus it securely locks and holds the receptacle to its lid, in order that when the lid is rotated by the crank E it may carry with it the cylinder of the cream-receptacle, the shaft F projecting through the orifice *e* being rigidly secured to the lid.

The lid *f* is constructed with an upper and lower wall, and into the recess thus formed is placed a non-conducting substance. This lid fits into the cylinder A, and its rim *f'* rests upon the top of the churn. In the rim are provided the horizontal recesses *g g*, adapted for reception of the clamps *h h*, and in fastening the lid the rim is placed beneath the clamps *h h*, which are rigidly secured to the churn, as shown.

The drain-tube H is threaded as a female screw for the reception of the threaded thumb-piece H', with which the mouth of the tube is closed in practice.

It often happens that persons having large refrigerators are, owing to the size thereof and the consequent necessity for keeping cool its entire area, compelled to purchase the same amount of ice whether the contents of the refrigerator be great or small; but by use of my small refrigerator, when such persons have, as often happens, but a single article occupying but a small amount of space to be preserved, the same may be placed in the receptacle and be kept cool with but little charge for ice.

What I claim is—

1. The combination of the recessed bottom *b'*, pivotal bar *c*, cream-receptacle B, and shaft F, substantially as shown, and for the purpose described.

2. The lid *d*, lug *h'*, cream-receptacle B, having recess D, and shaft F, substantially as shown and described.

3. The combination of the lid *f*, having the orifice *e*, and rim having recesses *g g*, with churn having clamps *h h*, substantially as shown and described.

In testimony whereof I affix my signature in presence of two witnesses.

CHARLES JOHN.

Witnesses:
 WILL P. OMOHUNDRO,
 EDWARD RYAN.